United States Patent

Platner et al.

[11] Patent Number: 5,590,914
[45] Date of Patent: Jan. 7, 1997

[54] FIELD ASSEMBLED GAS RISER

[75] Inventors: David K. Platner, Concord; James M. Lorenz, Madison; Michael J. Brennan, Jr., Perry; Brent H. Carrick, Madison, all of Ohio

[73] Assignee: Perfection Corporation, Madison, Ohio

[21] Appl. No.: 369,134

[22] Filed: Jan. 5, 1995

[51] Int. Cl.⁶ ................................. F16L 55/00
[52] U.S. Cl. ................... 285/23; 285/55; 285/93; 285/174; 285/258; 285/286; 285/351; 29/237; 29/507; 29/523
[58] Field of Search ................. 285/242, 255, 285/259, 258, 23, 55, 93, 174, 286, 351; 29/237, 450, 507, 523

[56] References Cited

U.S. PATENT DOCUMENTS

| | | |
|---|---|---|
| 3,401,447 | 9/1968 | Knight ........................ 29/450 |
| 4,229,025 | 10/1980 | Volgstadt et al. . |
| 4,293,147 | 10/1981 | Metcalfe et al. ............ 285/242 X |
| 4,407,526 | 10/1983 | Cicenas . |
| 4,449,740 | 5/1984 | Buzzi ....................... 285/258 X |
| 4,712,813 | 12/1987 | Passerell et al. . |
| 5,326,137 | 7/1994 | Lorenz et al. . |
| 5,367,756 | 11/1994 | Huetinck ....................... 29/237 |

FOREIGN PATENT DOCUMENTS

| | | | |
|---|---|---|---|
| 2660045 | 9/1991 | France ....................... 285/258 |
| 569632 | 11/1957 | Italy ............................ 285/242 |
| 331932 | 9/1958 | Switzerland ................ 285/258 |

*Primary Examiner*—Dave W. Arola
*Attorney, Agent, or Firm*—Fay, Sharpe, Beall, Fagan, Minnich & McKee

[57] ABSTRACT

A field assembled gas riser includes an adapter having plural inner grooves that receive the outer surface of a plastic gas line as it is plastically deformed by axial insertion of a stiffener into the gas line. The gas line is terminated at a desired location, the adapter slid over the terminated end, and a stiffener manually inserted into the gas line. Continued axial advancement of the stiffener acts as a mandrel to plastically deform the gas line into the grooves and provide a secure, sealed arrangement.

13 Claims, 7 Drawing Sheets

FIELD ASSEMBLED GAS RISER

BACKGROUND OF THE INVENTION

This application is directed to an assembled gas riser that conducts pressurized fluid, such as natural gas from a main to a meter, and a method of forming the gas riser. More particularly, the invention relates to a gas riser that can be formed in the field and eliminates the need for a separate interconnection with a service line extending from the gas main.

Commonly assigned U.S. Pat. No. 5,326,137 discloses a gas riser and a method of forming the riser. That gas riser, however, is a pre-manufactured assembly, i.e. manufactured in the shop and then shipped to the field as an assembled unit. The pre-assembled gas riser provides a transition connection between an underground service line, typically a plastic conduit or gas line, that leads from a main. The double-walled gas riser provides a rigid, metal conduit that houses an extension of the service line as it extends above ground for connection with a meter, valve, or meter set.

More particularly, conventional gas risers include an outer metal casing or pipe at one end and a plastic pipe or tube that extends through the outer casing and extends outwardly from one end of the outer casing. The other end of the metal pipe is connected to a delivery member, such as a gas meter manifold, at a location above ground. The plastic tube is buried underground and connected to the service line with a coupling or connector. Examples of commercially successful couplings used to interconnect the service line and gas riser are described in commonly assigned U.S. Pat. Nos. 4,229,025; 4,407,526; and 4,712,813 and form no part of the subject invention so that further discussion herein is deemed unnecessary.

It has been proposed to provide a gas riser that may be assembled in the field to eliminate a heretofore common connection between the service line extending from the gas main and connecting to the pre-manufactured gas riser, i.e. the coupling described in the above-mentioned patents. It is still necessary to address the same concerns associated with a pre-manufactured gas riser, as well as taking into consideration a secure, sealed, and easy to assemble gas riser.

The subject invention is deemed to meet these needs and others in a simple, efficient, and economical manner.

SUMMARY OF THE INVENTION

The present invention contemplates a new and improved gas riser and method of forming same that can be assembled in the field and eliminates a prior requirement for a connector between the service line and a pre-manufactured gas riser.

According to the present invention, the riser includes a plastic gas line, which is an extension of the service line. An adapter is received over a terminal end of the gas line and includes a series of internal grooves. A stiffener is manually inserted in the terminal end of the gas line. Upon insertion of the stiffener to its fullest extent within the adapter, the outer surface of the plastic gas line is urged into the internal grooves of the adapter to provide a sealed, secure engagement.

According to another aspect of the invention, a secondary sealing member is received over the stiffener for receipt in the adapter to provide a secondary seal in addition to the primary seal defined by the plastic deformed outwardly into the adapter grooves.

According to a method of assembling the gas riser in the field, the gas line is terminated at a desired location. The adapter is positioned over the gas line, and a stiffener partially inserted by hand in the terminal end of the gas line. The terminal end of the gas line with the partially inserted stiffener is then axially advanced into the adapter until the gas line is radially captured between the stiffener and the adapter. The stiffener is subsequently further advanced into the gas line so that the gas line is deformed radially outward into the adapter grooves.

A primary advantage of the invention is the elimination of the coupling between the service line and the gas riser.

Yet another advantage of the invention is the ability to assemble the gas riser in the field.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT AND METHOD OF ASSEMBLY

Figure 1:
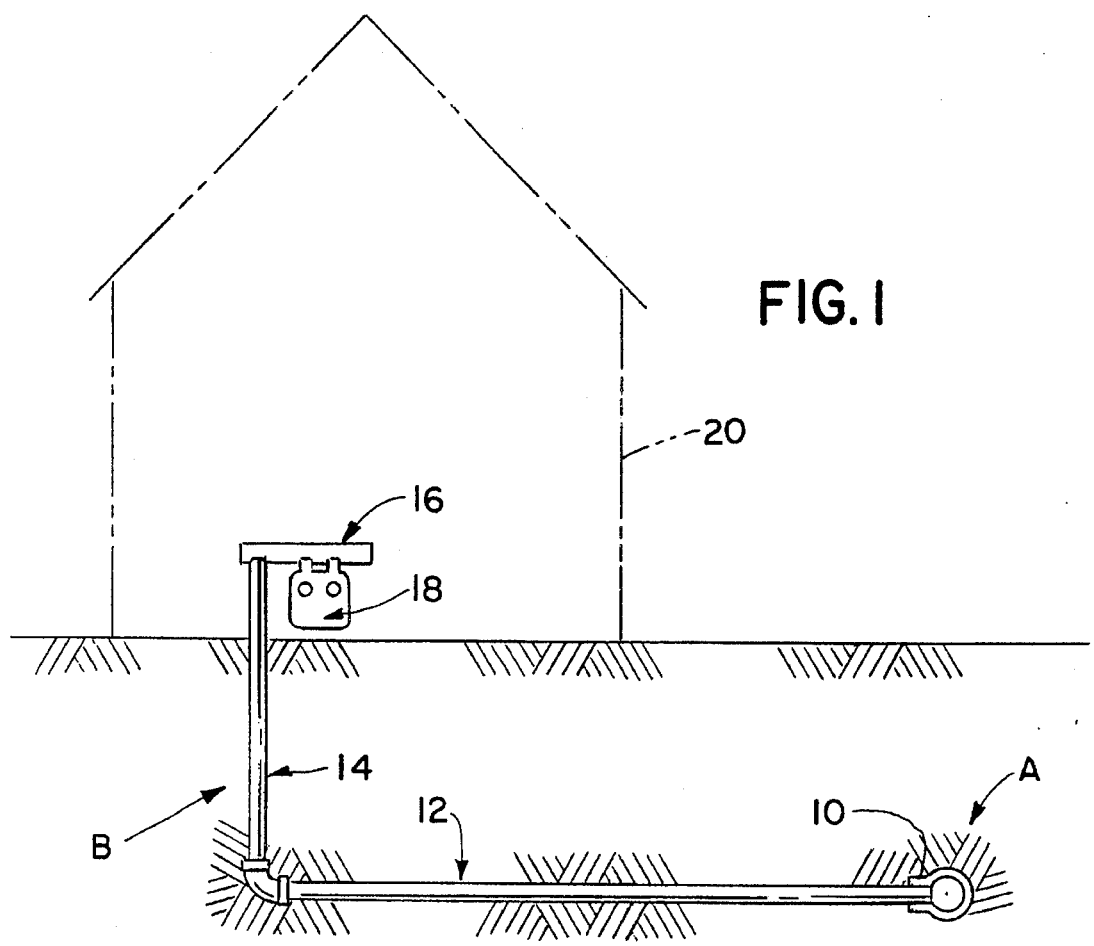
FIG. 1 is a schematic representation of a prior art assembly that provides for transmission of gas from a main to a meter.

Referring now to the drawings wherein the showings are for purposes of illustrating a preferred embodiment and method of assembling the invention only and not for purposes of limiting same, the FIGURES show a gas supply system A that provides natural gas service to a riser B or B'.

Figure 2:
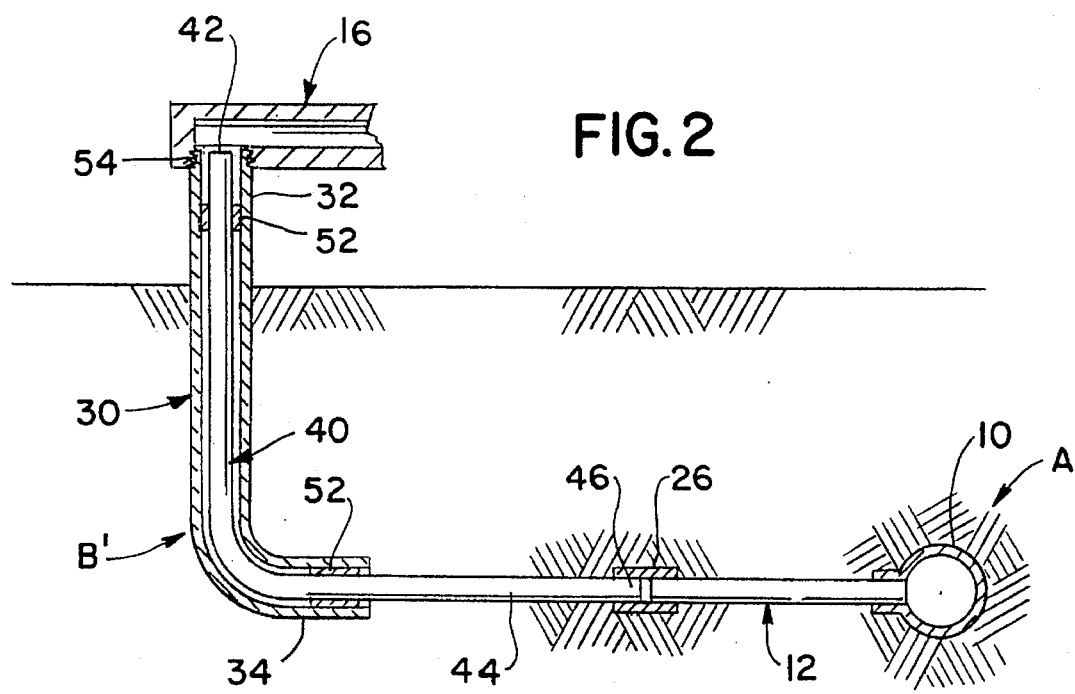
FIG. 2 is a schematic representation similar to that in FIG. 1 with selected portions of the assembly shown in cross section.

More specifically, and with reference to FIGS. 1 and 2, the source or supply is a gas main 10 from which extends a service line 12. As generally illustrated in FIG. 1, a vertically extending pipe or conduit 14 interconnects the service line 12 and main 10 to a manifold 16 and a meter 18 provided, for example, at a residence or business 20.

FIG. 2 shows a prior art arrangement where a coupling 26 interconnects a pre-manufactured gas riser 30 to the service line 12. The gas riser includes an outer metallic conduit or pipe 32 having a first or lower end 34 that is generally aligned with the service line. Received within the outer casing is an inner pipe or conduit 40, typically of plastic construction, that has a first or upper end 42 that terminates adjacent an upper end of the outer casing. A second end 46 of the plastic conduit 44 extends axially outward from the outer casing for connecting the second end with the service line 12 through the coupling 26.

A pair of spacers 50, 52 provide a sealed arrangement between the inner and outer conduits 30, 40. Additionally, the outer conduit includes an externally threaded region 54 at its upper end for connecting the gas riser with the manifold 16. As indicated above, this is the general prior art arrangement in which the pre-manufactured gas riser is connected to a service line 12 via the coupling 26 at one end and with the gas main through a manifold 16 at its other end.

Figure 3:
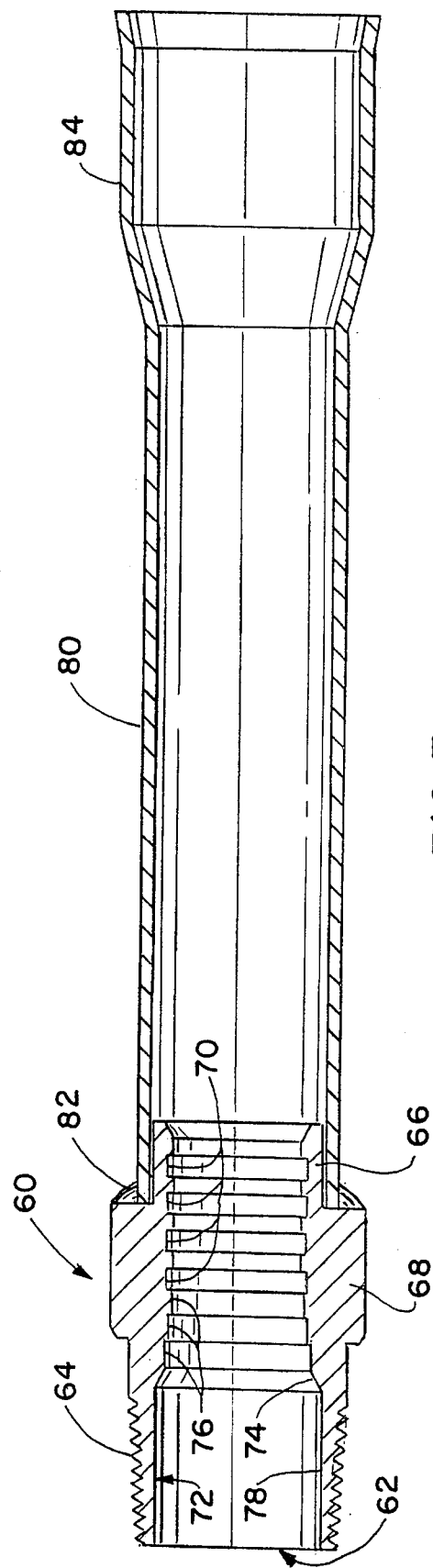
FIG. 3 is a longitudinal cross-sectional view through selected components of the subject new assembly.

Turning now to FIG. 3, the subject new field assembled gas riser will be described in greater detail. It includes an adapter or adapter nipple 60 (FIG. 4) having a first end 62 that is externally threaded along region 64. A second end 66 is of reduced diameter and merges into an enlarged shoulder 68 in a central portion of the adapter. A series of internal grooves 70 are axially spaced apart along an inner diameter of a throughbore 72. Moreover, a tapered internal shoulder 74 is disposed axially outward of the grooves 70 for reasons which will become more apparent below. Disposed intermediate the grooves 70 and the tapered shoulder 74 are a series of stepped counterbores 76 that progressively decrease in diameter as they extend from the tapered shoulder 74 toward the grooves 70. Additionally, the outer end of the throughbore defines a recess 78 extending inwardly to the tapered shoulder and that freely receives a stiffener therein as will be described in greater detail below.

Received over the inner end 66 of the adapter is an elongated casing or sleeve 80 as best shown in FIG. 3. The sleeve is adapted for free receipt over the outer diameter of a gas line, such as the service line extending from the main. The casing is preferably of rigid construction and secured to the adapter, for example, through a circumferential weld 82, although it will be understood that still other forms of connection can be used without departing from the scope and intent of the subject invention. A belled or enlarged diameter end 84 is provided at the opposite end of the casing to facilitate receipt of a flex conduit (not shown) over the gas line. The belled end of the casing is adhesively secured to one end of the flex conduit and the other end of the flex conduit typically includes a moisture seal or slip seal that seals about the outer diameter of the gas line. If no flex conduit is used, the remote end of the casing need not be belled and is provided with a moisture seal to limit ingress of dirt and moisture between the casing and gas line.

Once the plastic gas line has been terminated, i.e., cut to a desired length, the adapter and casing assembly of FIG. 3 is axially inserted over the terminal end of the plastic conduit. The outer diameter and wall thickness of the gas line are controlled by regulation. Therefore, the innermost diameter of the adapter is made sufficiently greater than the outer diameter of the gas line to provide a relatively easy, sliding fit thereover. The adapter is advanced over the gas line until the terminal end thereof extends axially outward from the adapter first end 62 and as will be described in greater detail below.

Figure 5:
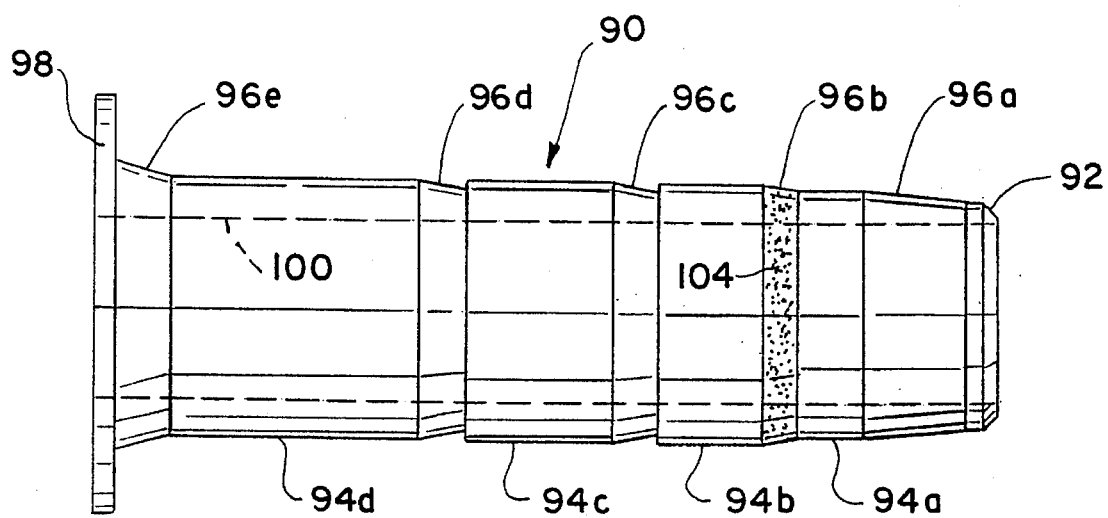
FIG. 5 is an elevational of a stiffener used in the subject new invention.

Turning now to FIG. 5, a stiffener 90 is separately shown and includes a first or small diameter end 92, a series of axially spaced lands 94a, 94b, 94c, 94d, tapered interconnecting regions 96a, 96b, 96c, 96d, 96e and an enlarged end 98. The enlarged diameter end 98 is sufficiently dimensioned to preclude further axial insertion thereof beyond tapered shoulder 74 of the adapter, and as will become more apparent below. The stiffener is of hollow construction, having an opening or bore 100 to allow the passage of gas therethrough.

Figure 4:
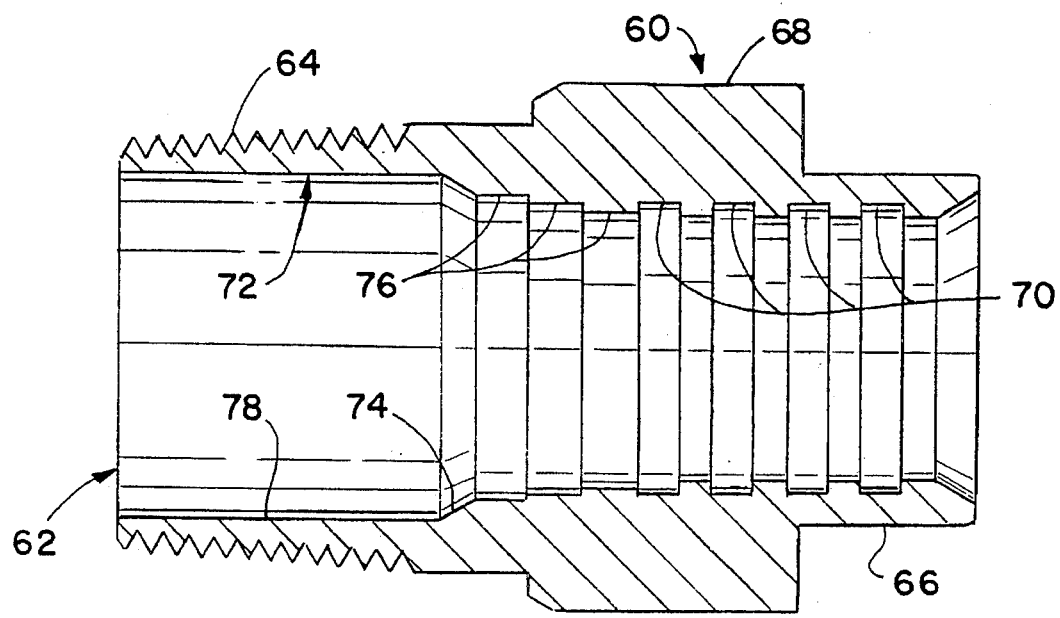
FIG. 4 is an enlarged, longitudinal cross-sectional view through a preferred adapter used in the subject invention.
Figure 6:
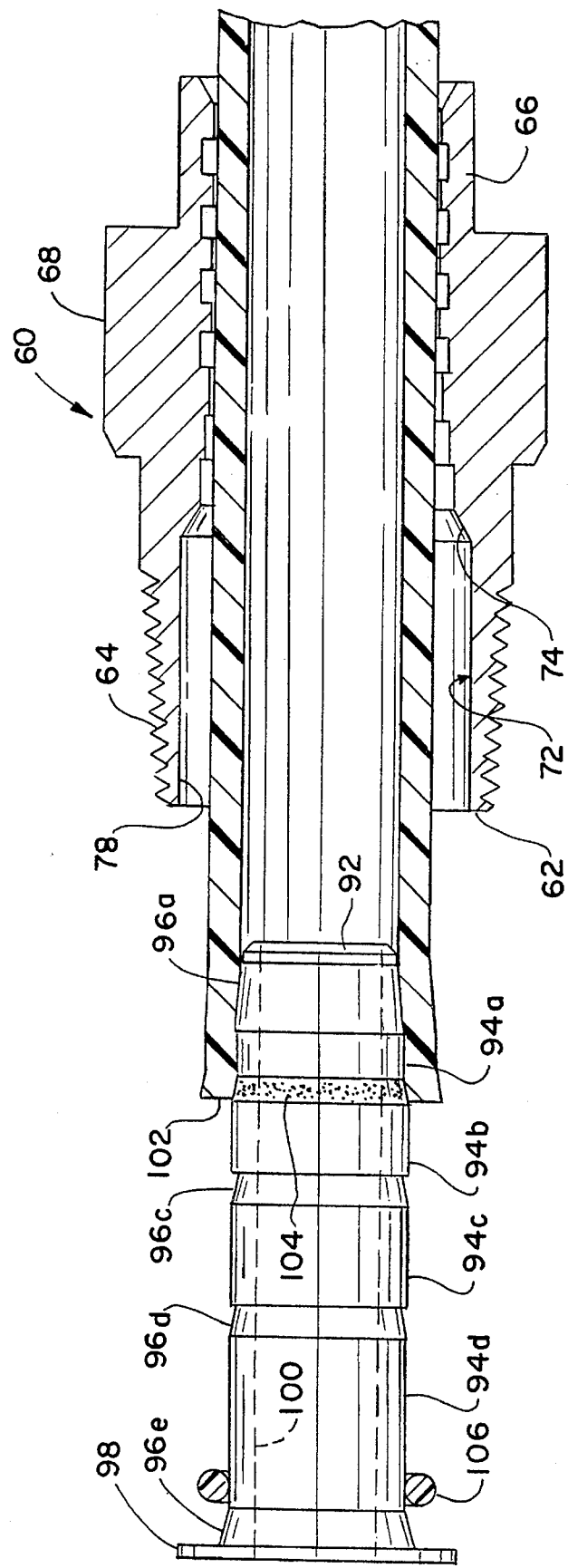
FIG. 6 illustrates initial steps in forming the subject new field assembled riser, a casing removed from the assembly for ease of illustration.

With continued reference to FIGS. 4 and 5, and additional reference to FIG. 6, the initial steps of assembly will now be described in greater detail. As shown, the service line 2 is terminated at a desired location to define a terminal end 02. The length of the service line is selected so that it will extend a sufficient axial distance to provide a continuous gas line to the manifold from the main. As alluded to above, this eliminates the use of a coupling that was required in order to connect the service line to the pre-assembled gas riser in prior art arrangements.

Once the service line 2 is terminated, the adapter and casing (not shown) are slidingly received over the end 102 by advancing the belled end 84 of the casing thereover and sliding the assembly until the service line extends through the adapter. The preferred position locates the terminal end 102 of the gas line axially outward of the adapter end 62. As best shown in FIG. 6, the stiffener is then advanced into the terminated end 102 of the service line. Particularly, the small diameter end 92 of the stiffener is manually advanced into the service line and elastically deforms the plastic material radially outward thereover. The gas line is advanced over the stiffener end 92, first tapered interconnecting region 96a, the first land 94a and over the second tapered interconnecting region 9b. Preferably, indicia such as represented by the shading 4 is provided on the external surface of the stiffener to provide positive indication of the extent of insertion of the stiffener into the gas line. The indicia can adopt any desired form such as a scribe or painted line on the stiffener to represent the desired extent of insertion of the stiffener into the gas line.

Figure 7:
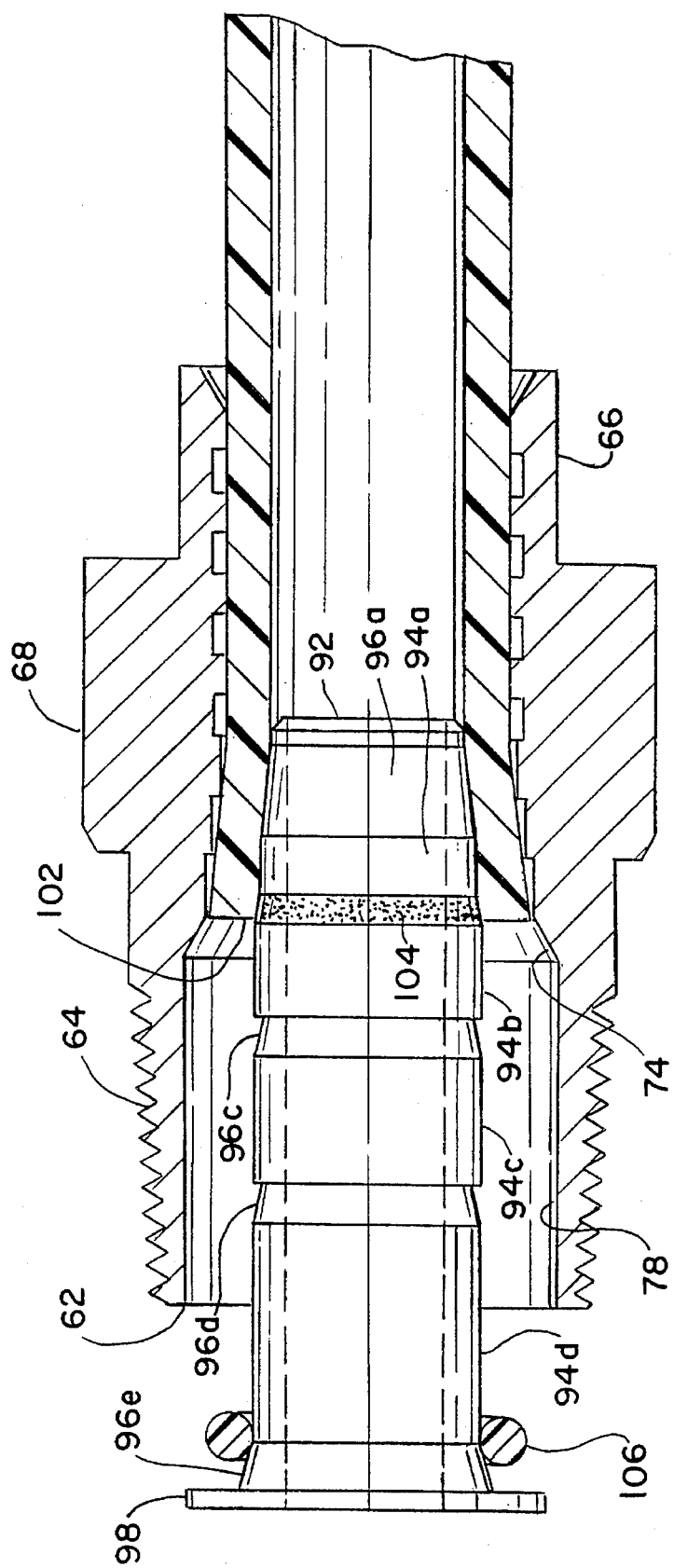
FIG. 7 is a view similar to FIG. 6 and illustrating intermediate steps in the formation of the gas riser.

Turning now to FIG. 7, the gas line with the partially inserted stiffener is then axially advanced into the adapter, particularly into the recess 78. The outward taper of the terminal end of the gas line when received over the stiffener closely matches the slope or taper of the stepped series of counterbores 76. Accordingly, the combined stiffener and gas line are inserted into the adapter to a point where the gas line is radially and axially locked between the insert and the adapter along the stepped counterbores.

Figure 8:
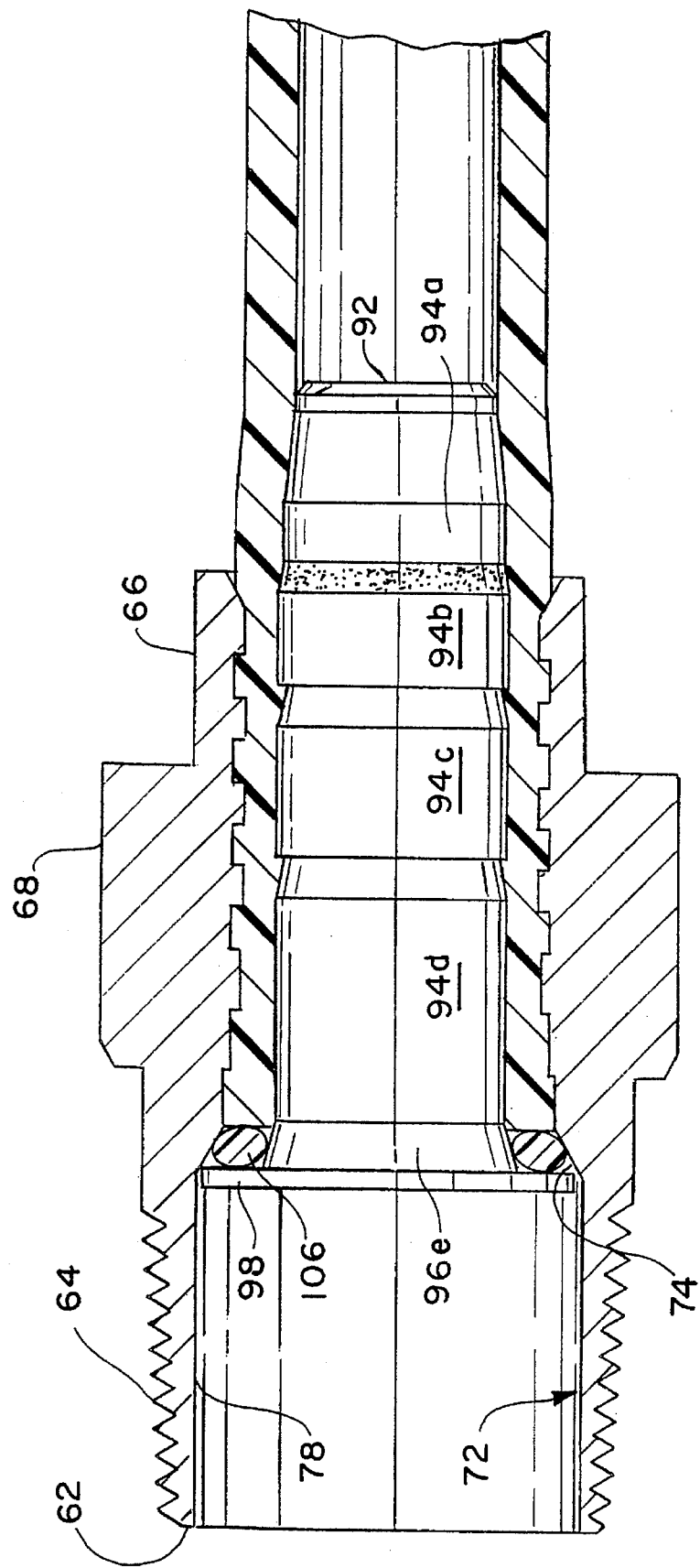
FIG. 8 is a view similar to FIGS. 6 and 7 showing the final assembly steps in forming the gas riser.

Continued advancement of the stiffener is then undertaken once the gas line is locked between the stiffener and the adapter as shown in FIG. 7. Accordingly, FIG. 8 illustrates the final steps in completing assembly of the gas riser in the field. A tool (FIG. 9) is employed to provide increased axial force required to axially advance the stiffener and plastically deform the gas line into the adapter grooves. More particular details of the tool will be described below. However, as represented in FIG. 8, the insert is advanced axially until the enlarged diameter flange 98 abuts the tapered shoulder 74 of the adapter as shown in FIG. 7. The lands 94a, 94b, of the stiffener act as a mandrel and plastically deform the outer surface of the service line radially outward into the grooves 70 in the adapter. Moreover, the lands 94c, 94d act as retention barbs to engage the stiffener and gas line together between the outer diameter of the stiffener and the inner diameter of the gas line.

The prior locking of the gas line between the stiffener and the adapter assures that the service line does not slip axially during the continued advancement of the stiffener into the gas line with the tool. Moreover, close dimensional tolerances between the outer diameter of the stiffener, the depth of the grooves in the adapter, and the diameter of the interconnecting portions between the grooves, assures that a secure, sealed engagement is provided between the outer surface of the service line and the inner diameter of the adapter. As will be understood, various dimensions and tolerances can be used without departing from the scope and intent of this invention as long as the gas line is retained in place during the mandrel-type deformation of the gas line into the adapter grooves. Additionally, a seal member such as o-ring 106 is received over the stiffener and provides a secondary seal between the stiffener and adapter to preclude leakage of any gas thereby.

Figure 9:
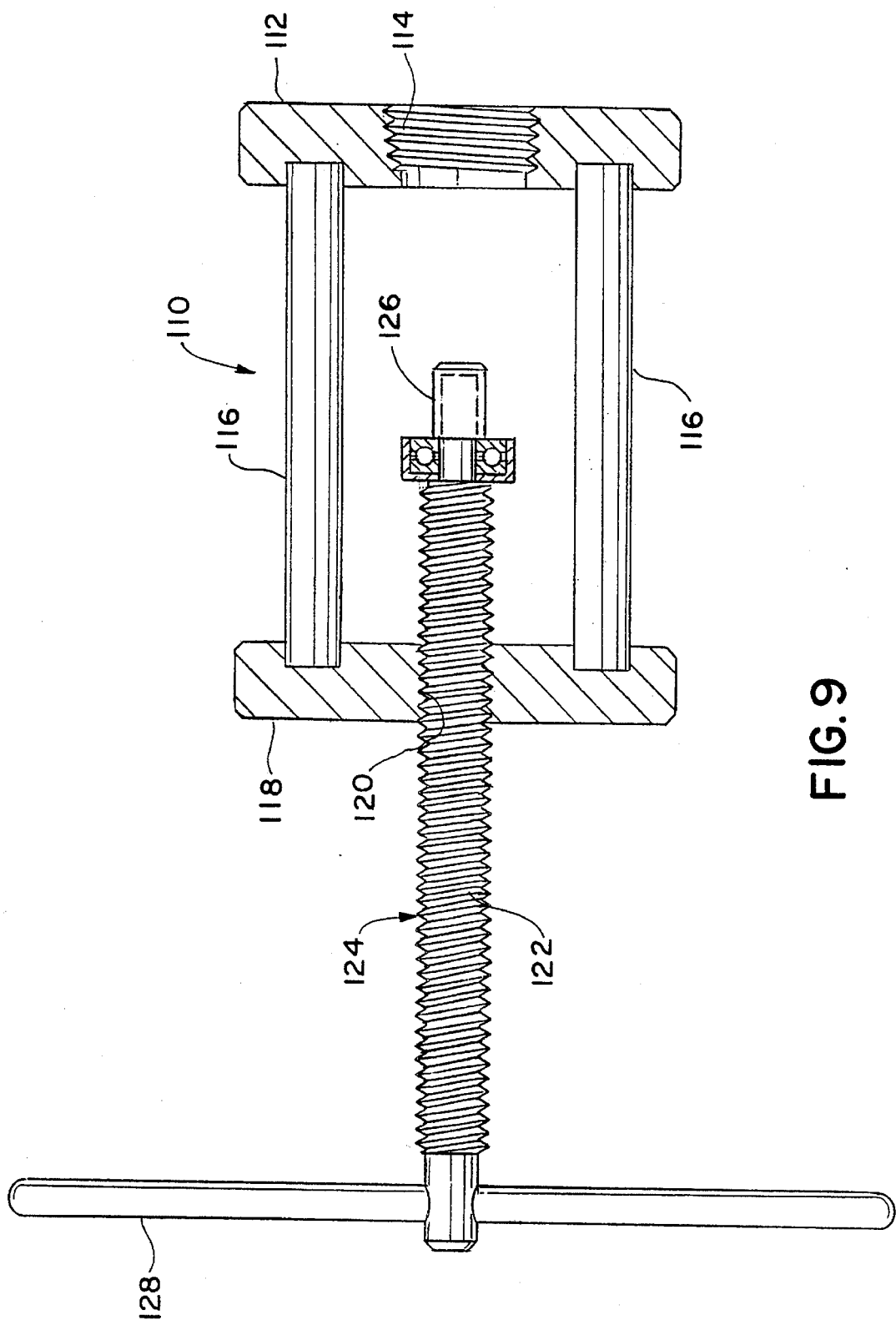
FIG. 9 is an elevational view with selected portions in cross-section of a tool used to facilitate assembly of the subject new gas riser.

Shown in FIG. 9 is a preferred tool 110 for advancing the stiffener to its innermost position within the adapter. As will be realized, sufficient axial force is required to overcome the natural resistance of the gas line to plastic deformation. The stiffener lands provide radial outward deformation of the gas line into the radial grooves of the adapter. The tool 110 to facilitate this mandrel-type action includes a first plate 112 having a threaded opening 114 therethrough. The threaded opening 114 is adapted for cooperative receipt over the threads 64 of the adapter. A set of interconnecting rods 116 secure the front plate 112 to a rear plate 118. The rear plate includes a threaded opening 120 through which a threaded rod of pusher member 124 extends. An inner end of the pusher member 124 includes a projection 126 over which the stiffener is temporarily received. Thus, rotation of hand wheel 128 in one direction will advance the pusher member 124 toward the first plate 112. This provides for axial advancement of the stiffener into the adapter.

Once the enlarged flange 98 of the stiffener engages the tapered shoulder 74 of the adapter, continued rotation of the hand wheel and axial advancement of the pusher member and stiffener is not possible. The outer surface of the gas line will have been radially deformed into the adapter grooves. The o-ring seal is properly positioned in place between the stiffener flange and the adapter, and thereafter rotation of the hand wheel in the opposite direction removes the pusher member. The entire tool can then be removed by rotating the first plate 112 to unthread the tool from the external threads 64 of the adapter of the completed gas riser.

The invention has been described with reference to the preferred embodiment and method of assembly. Obviously, modifications and alterations will occur to others upon a reading and understanding of this specification. For example, other tools may be used to advance the stiffener for deforming the gas line into the adapter grooves. Moreover, the particular number of grooves in the adapter or number of lands on the stiffener can be varied as desired. The subject invention is intended to include all such modifications and alterations insofar as they come within the scope of the appended claims or the equivalents thereof.

Having thus described the invention, it is claimed:

1. A field assembled riser comprising:
    a plastic tubular gas line having an inner diameter, a preselected wall thickness, a preselected outer diameter, and a terminal end;
    a generally cylindrical stiffener having a reduced diameter at a first end freely received in the gas line, a shoulder at a second end having an enlarged diameter substantially greater than the inner diameter of the gas line to prevent further insertion of the stiffener therein, and a series of spaced lands disposed between the first and second ends of the stiffener; and
    an adapter received over the gas line adjacent the terminal end thereof, the adapter having a series of axially spaced, circumferential grooves defined along an inner diameter of the adapter, the grooves being interconnected by shoulders that extend radially inward from the grooves and are dimensioned for free sliding receipt over the outer diameter of the gas line, the adapter further including a series of stepped counterbores along the inner diameter between one end of the adapter and the grooves and shoulders, the counterbores having a diameter greater than the shoulders to cooperate with the stiffener to preliminarily hold the gas line between the stiffener and adapter as the stiffener is advanced axially further into the adapter and the outer diameter of the gas line is plastically deformed into the grooves of the adapter.

2. The field assembled riser as defined in claim 1 wherein the stiffener includes at least two different diameter lands interconnected by tapered shoulders between the lands that urge the gas line over the lands and deform the gas line into the grooves as the stiffener is further inserted into the adapter.

3. The field assembled riser as defined in claim 1 wherein the adapter includes an external threaded region at a first end adapted for connection with an associated meter, valve, or meter set.

4. The field assembled riser as defined in claim 1 wherein the adapter includes a recess extending axially inward from a first end thereof that is dimensioned to freely receive the gas line and stiffener therein.

5. The field assembled riser as defined in claim 4 wherein the adapter includes an extension at a second end thereof that receives a casing thereover to provide a rigid sleeve of predetermined length over the gas line.

6. The field assembled riser as defined in claim 1 further comprising a seal member disposed along an outer surface of the stiffener adjacent the enlarged diameter second end for providing a secondary seal between the gas line and the adapter.

7. A gas riser for terminating an end of a gas line, the riser comprising:
    a plastic tubular gas line having an inner diameter, outer diameter, and a terminal end;
    an adapter received over the outer diameter of the gas line, the adapter including a series of grooves defined along an inner diameter thereof that receive an outer surface of the gas line therein to seal between the gas line and the adapter; and
    a stiffener having a reduced diameter first end that is freely received in the gas line and a series of axially spaced lands having an outer dimension greater than the inner diameter of the gas line and spaced from the stiffener first end so that the stiffener first end may be initially freely inserted into the gas line and subsequent additional insertion of the stiffener into the gas line facilitating plastic deformation of the gas line into the grooves of the adapter.

8. The riser as defined in claim 7 wherein the adapter further includes a tapered surface that interconnects the grooves with a recess at a first end thereof, the recess having a diameter larger than the outer diameter of the gas line to freely receive the gas line and stiffener therein.

9. The riser as defined in claim 8 wherein the adapter includes an external threaded region adjacent the first end to facilitate connection with an associated meter, valve, or meter set.

10. The riser as defined in claim 7 wherein the stiffener includes tapered regions that interconnect the lands.

11. The riser as defined in claim 7 further comprising a seal member received over the stiffener adjacent the second end thereof for providing secondary sealing between the stiffener and the gas line.

12. The riser as defined in claim 7 further comprising a rigid sleeve received over the gas line.

13. The riser as defined in claim 12 wherein the sleeve is welded to the adapter second end.

\* \* \* \* \*